(12) United States Patent
Jollie

(10) Patent No.: US 10,383,292 B2
(45) Date of Patent: Aug. 20, 2019

(54) SYSTEM AND METHOD FOR CULTIVATING PLANTS

(71) Applicant: Double J Holdings, LLC, Lisbon, WI (US)

(72) Inventor: Jesse L. Jollie, Lisbon, WI (US)

(73) Assignee: Double J Holdings, LLC, Lisbon, WI (US)

( * ) Notice: Subject to any disclaimer, the term of this patent is extended or adjusted under 35 U.S.C. 154(b) by 261 days.

(21) Appl. No.: 15/615,493

(22) Filed: Jun. 6, 2017

(65) Prior Publication Data

US 2017/0347548 A1    Dec. 7, 2017

Related U.S. Application Data

(60) Provisional application No. 62/345,964, filed on Jun. 6, 2016.

(51) Int. Cl.
*A01G 31/02* (2006.01)
*A01G 9/029* (2018.01)
*A01G 24/00* (2018.01)

(52) U.S. Cl.
CPC ............ *A01G 31/02* (2013.01); *A01G 9/0297* (2018.02); *A01G 24/00* (2018.02); *Y02P 60/216* (2015.11)

(58) Field of Classification Search
CPC .. A01G 31/00; A01G 2031/006; A01G 31/02; A01G 27/00; A01G 27/005; A01G 27/006; A01G 27/02; A01G 27/06
See application file for complete search history.

(56) References Cited

U.S. PATENT DOCUMENTS

| | | | | | |
|---|---|---|---|---|---|
| 3,992,809 | A | * | 11/1976 | Chew | A01G 31/02 47/62 R |
| D245,684 | S | * | 9/1977 | Julinot | D11/155 |
| 5,225,342 | A | * | 7/1993 | Farrell | A01G 5/06 435/430 |
| 8,549,788 | B2 | * | 10/2013 | Bryan, III | A01G 31/02 47/62 C |
| 9,113,606 | B2 | * | 8/2015 | Gardner | A01G 31/00 |
| 2011/0056132 | A1 | * | 3/2011 | Gardner | A01G 9/16 47/62 R |
| 2014/0101999 | A1 | * | 4/2014 | Gardner | A01G 31/00 47/62 C |
| 2017/0354096 | A1 | * | 12/2017 | Xing | A01G 9/023 |

FOREIGN PATENT DOCUMENTS

| | | | | |
|---|---|---|---|---|
| CA | 2473590 A1 | * | 1/2005 | A01G 31/02 |
| EP | 3329766 A1 | * | 6/2018 | A01G 31/06 |

* cited by examiner

*Primary Examiner* — Kristen C Hayes

(74) *Attorney, Agent, or Firm* — Andrew C. Landsman; Godfrey & Kahn, S.C.

(57) ABSTRACT

A self-contained system for cultivating plants using a combination of aeroponic and hydroponic processes includes a container having successive size reductions to support plant cups, a liquid distribution device, and to provide a reservoir for storing a water and nutrient solution.

13 Claims, 14 Drawing Sheets

SYSTEM AND METHOD FOR CULTIVATING PLANTS

CROSS-REFERENCE TO RELATED APPLICATION

This application is based on and claims priority to U.S. Provisional Patent Application No. 62/345,964 filed on Jun. 6, 2016, which is incorporated herein by reference in its entirety for all purposes.

FIELD OF THE INVENTION

The present invention relates generally to the field plant cultivation. More particularly, the present invention relates to a system and method for cultivating plants.

BACKGROUND

Traditional plant cultivation begins with planting a seed, sapling, or clone in soil in an outside environment or greenhouse. The plants grow by irrigating them and exposing them to sunlight. Although farmers and gardeners have for a long time been able to control the irrigation process when plants are grown in greenhouses, sunlight exposure is still very much up to Mother Nature. Even in outdoor environments, farmers rely on irrigation systems to ensure the plants receive the correct amount of water. Unpredictable conditions for cultivating plants is not optimal and often results in less than ideal cultivation results.

Throughout the $20^{th}$ century, agriculturalists began developing methods of plant cultivation without soil. It was discovered that many plants can be grown with their roots exposed i.e., not planted in soil, as long as the roots are exposed to mineral nutrient solutions. Researchers learned that soil's only real purpose is to provide a structure in which a root system can form where nutrients can be held close to the plant roots. Early attempts at cultivating plants without soil replaced the soil with a water and nutrient solution. This type of cultivation is typically called hydroponic, although it is also sometimes referred to as aquaponic cultivation.

Plants grown in a soil-free environment tend to grow well and produce high yields because the plant roots have a constant supply of oxygen and may have access to as much or as little water as they need. Water in soil-free growing systems may also be reused continuously, thereby lowering water costs.

Existing soil-free plant cultivation systems offer significant limitations, however. In particular, hydroponic systems require large quantities of water to effectively replace the typical soil volume with a water and nutrient solution. A different byt related type of system is an aeroponic system, which is also soil-free. Aeroponic systems use mist to contact the plant roots in a grow chamber that is separate from a reservoir. The mist in a typical aeroponic system is fog-like, in that the droplets are very small.

Typical aeroponic systems are not self-contained, requiring external pumps, reservoirs, or other parts. In addition, typical high pressure aeroponic systems cannot maintain plant health in the event of component failure or power outages cost effectively. Existing solutions include, but are not limited to incorporating redundant pump components, back-up power sources, self-cleaning misting heads, and such, increasing costs. Additionally, due to those costs, typical high pressure aeroponic systems are solely designed for function and not visual appeal to the masses.

As such, there is a need for a self-contained system for growing and cultivating plants in a controlled environment using a minimal amount of water and at a reduced cost compared to existing aeroponic growing systems.

SUMMARY

The present invention relates to a self-contained system and method for cultivating plants. The system includes an enclosure having an internal cavity and an open top. A container is disposed within the internal cavity. The container has a top portion having a first size, a middle portion extending downward from the top portion and having a second size that is smaller than the first size, and a bottom portion extending downward from the middle portion and having a third size that is smaller than the second size. The container further also includes at least one shelf positioned at the transition between the middle portion and the bottom portion. A liquid distribution device is supported by the shelf portion and includes a plurality of liquid emission locations to deliver liquid to desired locations within the container and at least one coupling location for attaching a source of liquid. A lid including at least one cup support opening is supported by the container. At least one cup support is positioned in the at least one cup support opening. Each cup support includes at least one plant cup opening. At least one plant cup is positioned in the at least one plant cup opening. Each plant cup includes a plurality of openings to allow plant roots and liquid to pass therethrough and is capable of supporting a plant. Finally, a frame is removably attached to the enclosure and is configured to provide support for at least one illumination device.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
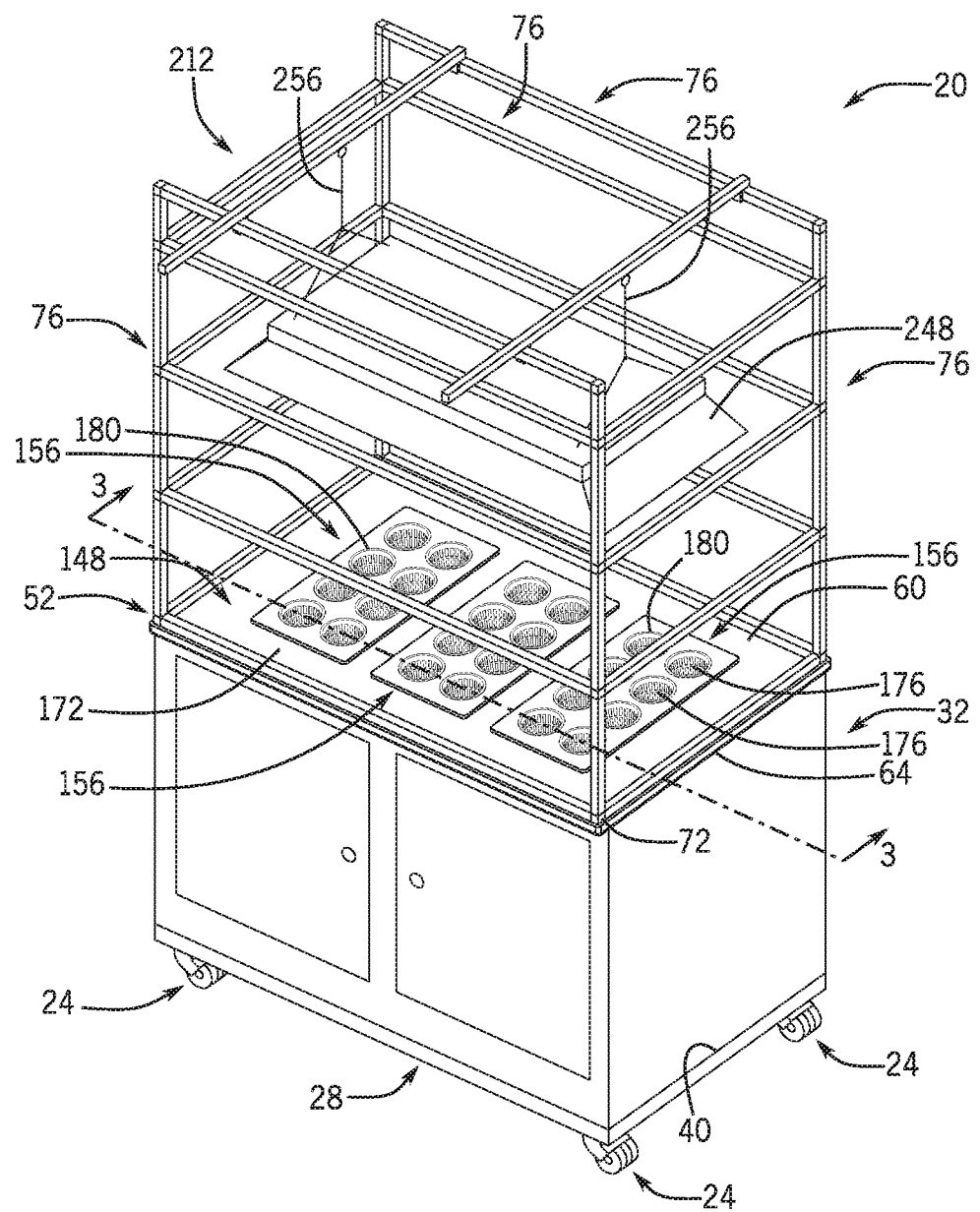
FIG. 1 is a perspective view of one embodiment of a plant cultivation system in accordance with the invention.
Figure 2:
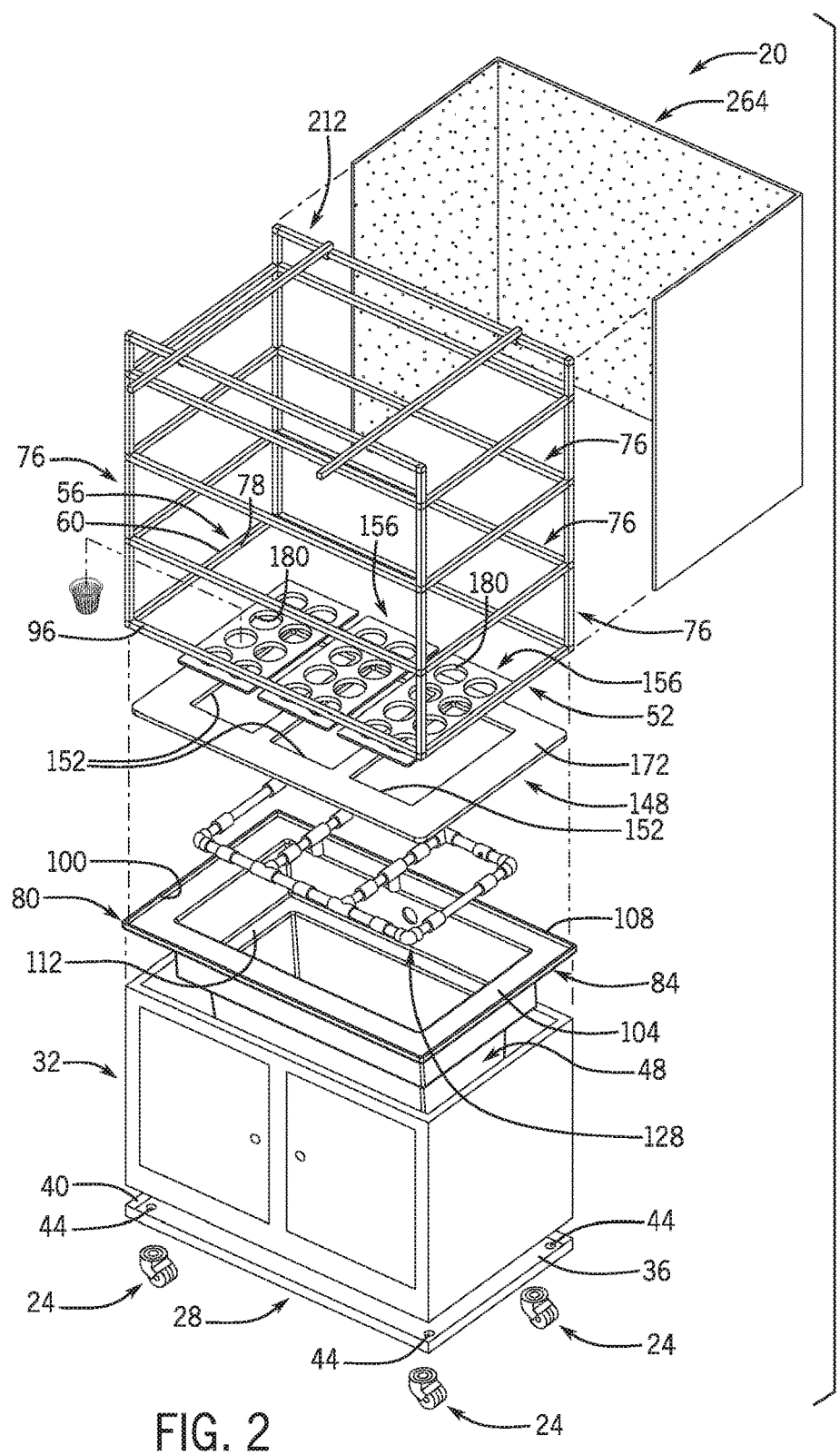
FIG. 2 is an exploded perspective view of the plant cultivation system of FIG. 1.
Figure 3:
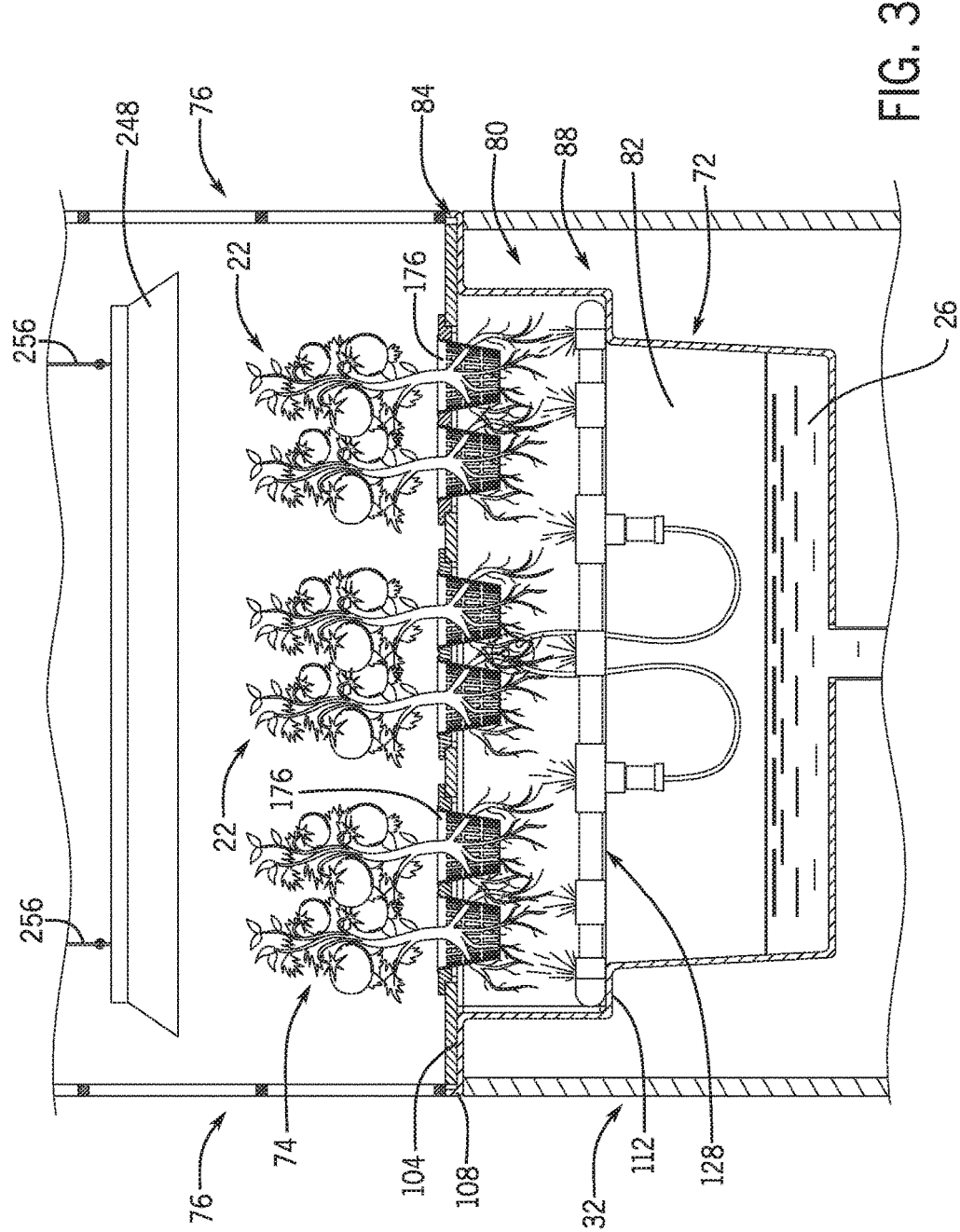
FIG. 3 is a partial section view of the plant cultivation system of FIG. 1, taken generally along the line 3-3 in FIG. 1, showing one embodiment of how plants are exposed to a nutrient solution in accordance with the present invention.
Figure 4:
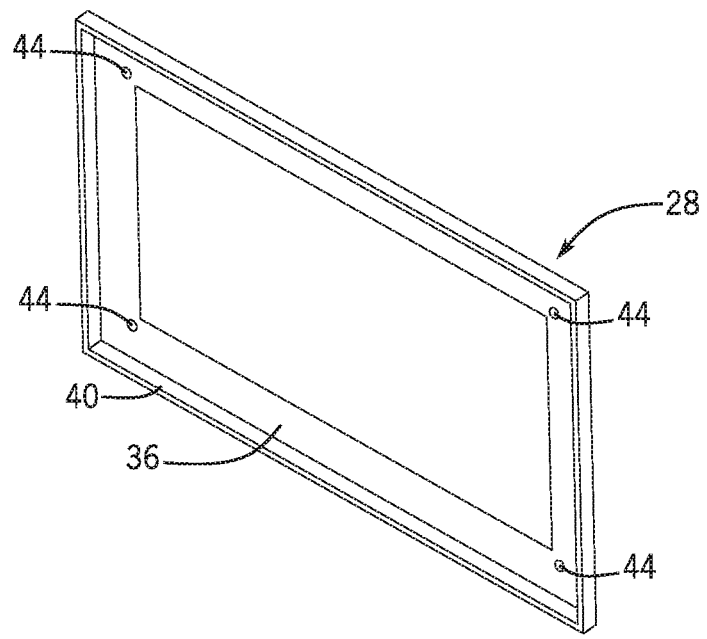
FIG. 4 is a perspective view of one embodiment of a base of the plant cultivation system of FIG. 1.
Figure 5:
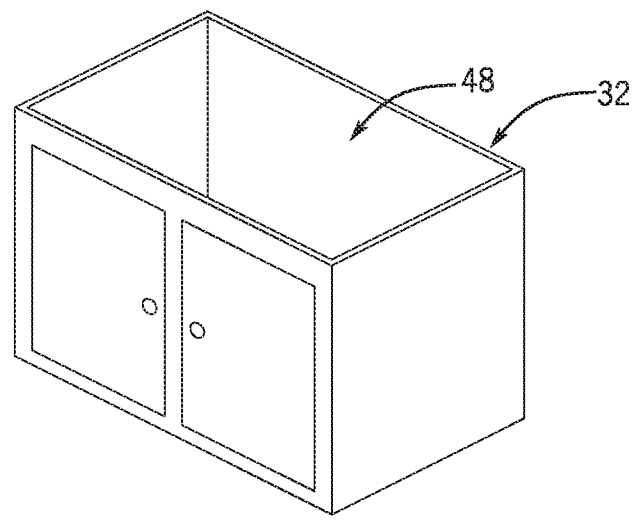
FIG. 5 is a perspective view of one embodiment of an enclosure of the plant cultivation system of FIG. 1.
Figure 6:
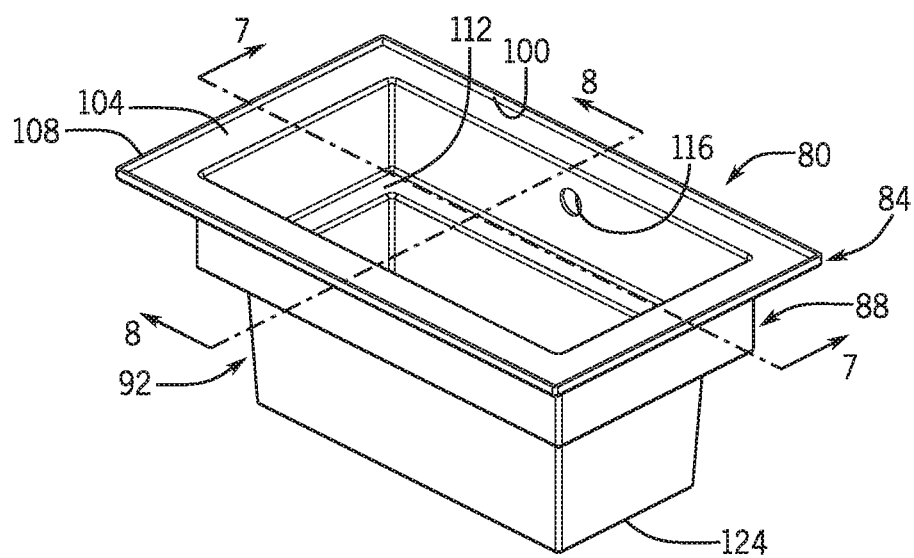
FIG. 6 is a perspective view of one embodiment of a container of the plant cultivation system of FIG. 1.

This invention relates to a system 20 for cultivating plants 22 (see FIG. 3) using an aeroponic process. FIG. 1 shows one embodiment of a system 20 for cultivating a wide variety of plants in a wide variety of manners and processes. Each of the above methods allows the cultivation of plants in the absence of soil. System 20 may be configured to be utilized indoors and not exposed to exterior conditions such as, for example, sunlight, precipitation, etc. However, system 20 may also be used outdoors without departing from the invention. Although plants 22 are shown as tomatoes in FIG. 3, any suitable plant may be grown using system 20 without departing from the invention.

Referring now to FIG. 1, one embodiment of system 20 is shown. In the embodiment shown, system 20 includes a plurality of rollers, or casters, or wheels 24 or any other suitable devices that allow the system to be easily moved. In a further embodiment, system 20 may not be portable and, accordingly, would not include devices allowing the system 20 to be portable.

Turning now to FIGS. 1-5, system 20 includes a base 28 and an enclosure 32. In the embodiment shown, the wheels 24 are coupled to and positioned on a bottom side of base 28 whereas enclosure 32 is supported on or coupled to a top surface 36 of base 28. In the embodiment shown, base 28 further includes a lip 40 that extends around top surface 36. A plurality of apertures 44 are defined in base 28 to accommodate coupling of wheels 24 to the base. In the embodiment shown, wheels 24 are two-inch dual wheel casters, but any suitable type and size of wheels 24 may be used without departing from the invention.

In the embodiment shown, base 28 is made of a single sheet of 13-gauge e-coated mild steel, but any suitable material may be used without departing from the invention. As shown, base 28 has a complementary shape to a shape of the enclosure 32 such that enclosure 32 rests on top of top surface 36 and lip 40 relatively tightly surrounds the enclosure. Base 28 provides stability and rigidity to enclosure 32 due to the complementary shape of lip 40 and the size of the enclosure. That is, the lip 40 provides lateral support to sides of the enclosure 32. Although the embodiment shown includes lip 40, alternatively enclosure 32 may be secured to base 28 by any suitable means without departing from the invention. Further, alternative embodiments may include a base 28 that is integrally formed with enclosure 32, negating the need for lip 40.

Enclosure 32 may have any of a wide variety of sizes, shapes, configurations, functionalities, capabilities, etc., and all such possibilities are intended to be within the spirit and scope of the present disclosure. In the embodiment shown, enclosure 32 has a cabinet configuration and includes a pair of doors that may either be decorative or functional. Additionally, enclosure 32 includes an open top to define an internal cavity 48 within the enclosure. In one embodiment, the enclosure 32 may have dimensions of about 36 inches wide by about 21 inches deep by about 23 inches in height.

In an alternative embodiment, system 20 may be installed in an existing cabinet already mounted in, for example, a kitchen. In this embodiment, the other components of system 20 (described in more detail below) may cooperate with this existing enclosure or cabinet. As indicated above, enclosure 32 may have any of a wide variety of shapes, sizes and configurations, and the other components of the system 20 may have any of a wide variety of shapes, sizes and configurations to complement enclosure 32, and all such possibilities are intended to be within the spirit and scope of the present disclosure.

Referring now to FIGS. 2-3 and 6-8, the system 20 includes a container 80. Container 80 may have a wide variety of shapes, sizes and configurations, and all such possibilities are intended to be within the spirit and scope of the present disclosure. In the embodiment shown, container 80 is generally rectangular in shape and includes a top portion 84 having a first size, a middle portion 88 extending downward from or positioned below the top portion 84 and having a second size stepped-down or smaller than the top portion 84, and a bottom portion 92 extending downward from or positioned below the middle portion 88 and having a third size stepped-down or smaller than the middle portion 88. The top portion 84 defines a recess 100 therein provided by a top surface 104 and a lip 108 extending around the top surface 104. Said another way, top surface 104 is recessed below a top edge of lip 108. A shelf 112 is provided at a transition between middle portion 88 and bottom portion 92 of container 80. In the embodiment shown, an access opening 116 is defined through a rear side of middle portion 88. Access opening 116 provides access of necessary piping, equipment, etc., to access an interior of the container 80. Access opening 116 may be at any location within container 80 and the opening may have any suitable configuration without departing from the invention. In other embodiments, necessary piping, equipment, etc., may access an interior of the container 80 in other manners without requiring access opening 116. In the embodiment shown, container 80 is supported in enclosure 32 by top portion 84, which rests on the open top of the enclosure.

Figure 7:
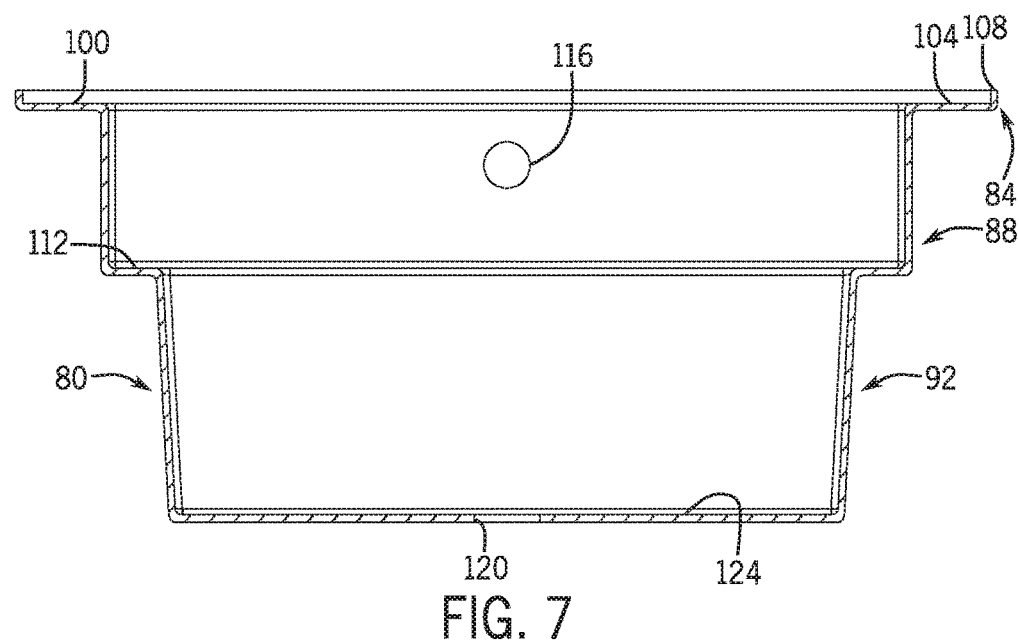
FIG. 7 is a section view of the container of FIG. 6, taken generally along the line 7-7 in FIG. 6.
Figure 8:
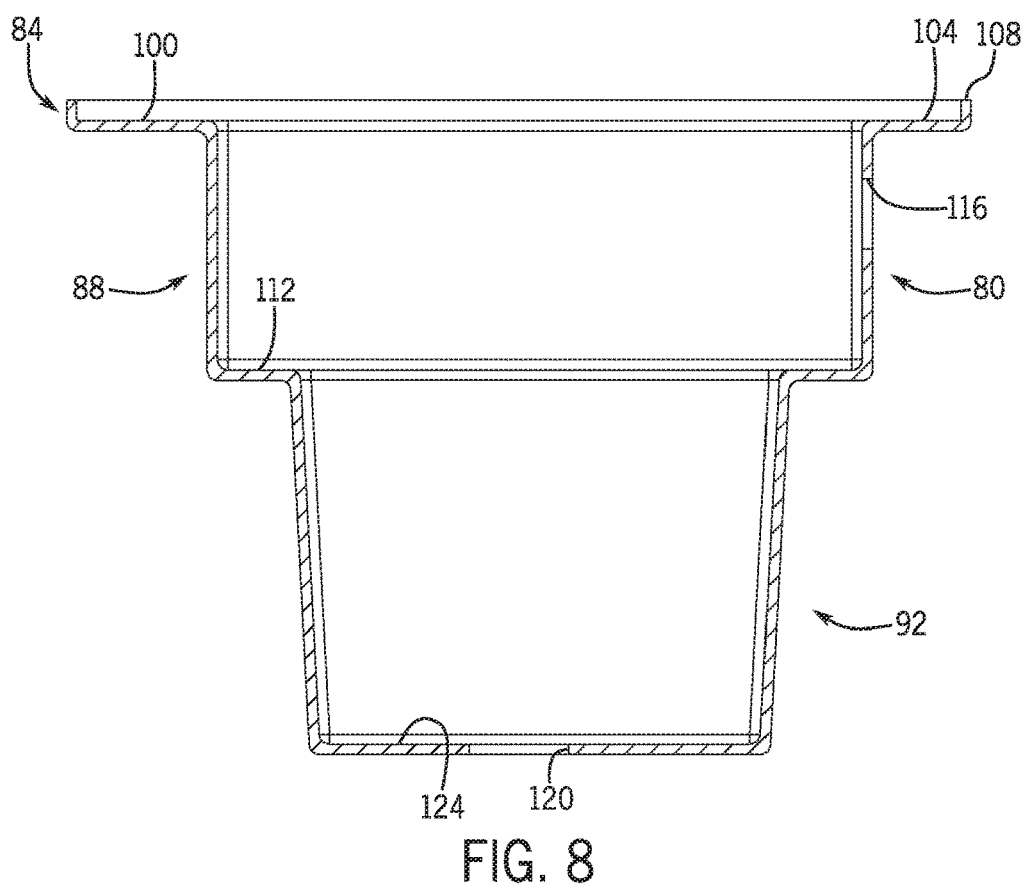
FIG. 8 is another section view of the container of FIG. 6, taken generally along the line 8-8 in FIG. 6.

As shown in FIGS. 7 and 8, container 80 also includes a drain 120 through which liquid and debris may drain from container 80. Drain 120 may have any suitable shape and location within container 80 without departing from the invention. As shown, drain 120 is positioned in a bottom surface 124 of container 80 or bottom portion 92. In one embodiment, middle portion 88 may taper in size from top to bottom, where the middle portion is larger in size at a top of middle portion 88 and smaller in size at a bottom of middle portion 88. Such a taper may be continuous along the height of middle portion 88 or only a portion of the height of the middle portion. In another embodiment, bottom portion 92 may taper in size from top to bottom, where the bottom portion 92 is larger in size at a top of the bottom portion 92 and smaller in size at a bottom of the bottom portion 92. This taper may be continuous along the height of the bottom portion 92 or only a portion of the height of the bottom portion 92. In yet another embodiment, both the middle and bottom portions 88, 92 may taper from top to bottom. In embodiments with tapered portions, such tapered portions may allow stacking of a plurality of containers 80 in a nested manner without the containers 80 becoming stuck together.

Figure 9:
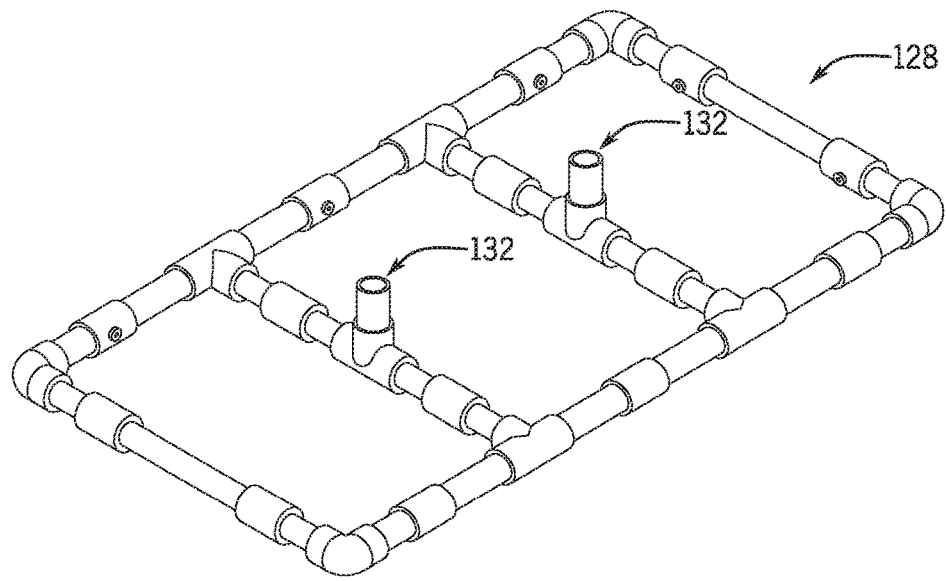
FIG. 9 is a perspective view of one embodiment of a liquid distribution device of the plant cultivation system of FIG. 1 showing the bottom of the liquid distribution device.
Figure 9A:
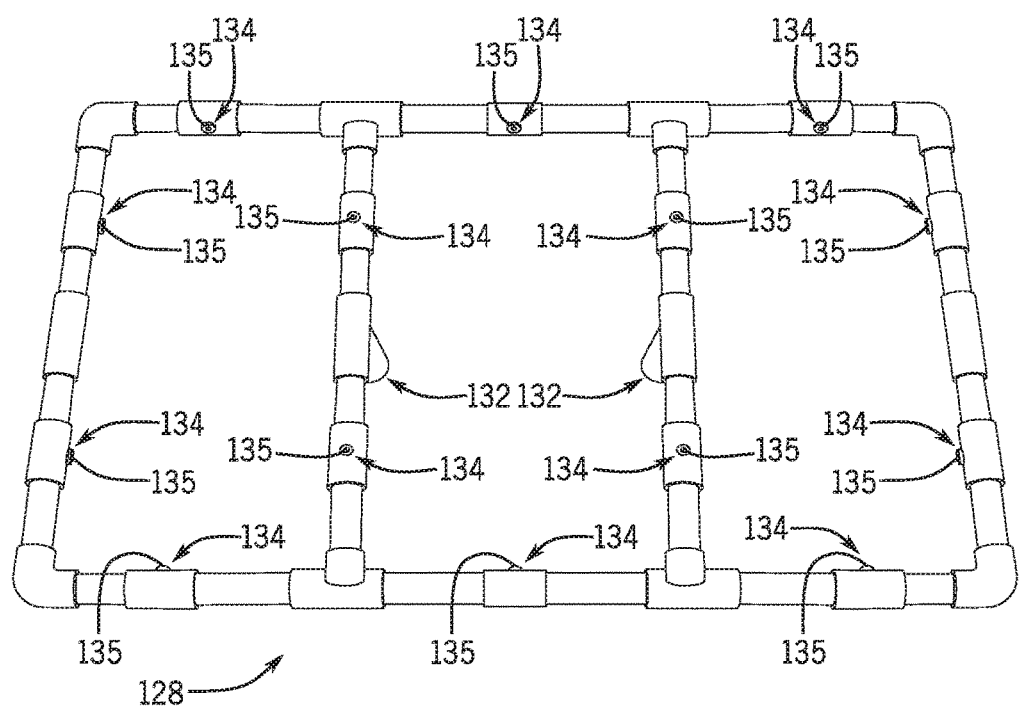
FIG. 9A is another perspective view of the liquid diffusion device of FIG. 9, showing the top of the liquid diffusion device.

Referring now to FIGS. 9 and 9A, system 20 further includes a liquid distribution device 128 configured to receive liquid from a liquid source and distribute the liquid to desired locations within the system. Liquid distribution device 128 may have a variety of shapes, sizes and configurations and may be operated in a variety of manners to distribute liquid in a variety of manners, and all such possibilities are intended to be within the spirit and scope of the present disclosure. In the embodiment shown, liquid distribution device 128 is comprised of a plurality of interconnected pipes or tubes and is supported on shelf 112 provided in container 80. Shelf 112 and, therefore, the liquid distribution device 128, may be optimally located to provide adequate liquid distribution to plants 22 cultivated in system 20.

A nutrient solution 26 may be stored within container 80. As in systems for hydroponic growing, mature roots may can still absorb nutrient solution 26 via means found typical in Deep Water Culture, a common hydroponic method, because the roots contact the stored nutrient solution. However, in Deep Water Culture, when air pump failure occurs due to mechanical failure or power outages, adequate oxygen no longer exists for the roots, and the plant dies within a couple days at most due to the plant roots drowning. System 80 allows for a hybrid cultivation method described within, and allows for a user adjustable air gap 82 (See FIG. 3) above the stored nutrient solution 26 for the absorption of nutrients in an atomized method allowing new root development instantaneous absorption provided via typical high pressure aeroponic methods while enhancing the growth performance over a more forgiving Deep Water Culture method. Lastly, air gap 82 provides access to oxygen to sustain plant life longer while the bottoms of the roots absorb moisture in the typical drowning environment.

In the embodiment shown, liquid distribution device 128 also includes a pair of coupling locations 132 where a plurality of plumbing fittings may be selectively coupled to accommodate for numerous formats of supplying liquid distribution. In one embodiment, one coupling location 132 and associated pluming fitting may feed liquid into the liquid distribution device 128 and the second coupling location 132 and associated plumbing fitting may be a feed supply for additional liquid distribution devices 128 coupled in series. While the embodiment shown of the liquid distribution device 128 includes two coupling locations 132, the liquid distribution device 128 is capable of including any number of coupling locations 132 and all of such possibilities are intended to be within the spirit and scope of the present disclosure. In one embodiment, the coupling locations 132 may be female fittings. In one embodiment, one of the fittings may be coupled to a pump and the other fitting may be plugged with a plug. In other embodiments, the fittings may be used to couple additional systems 20 together in series. In such an embodiment, any pump(s) of the system(s) 20 would be sized appropriately to accommodate pressure and flow requirements of the number of systems 20 coupled together.

As shown in FIG. 9A, liquid distribution device 128 includes a plurality of liquid emission locations 134 for emitting, spraying, etc., liquid into container 80. Liquid distribution device 128 may include misting heads 135 positioned at locations 134. In other embodiments, the system 20 may include any suitable liquid emission or delivery device without departing from the invention. In other embodiments, the liquid distribution device 128 may include any number of locations 134 and any number of associated misting heads, and all of such possibilities are intended to be within the spirit and scope of the present disclosure. Misting heads 135 may be threaded to locations 134, but may alternatively be secured to locations 134 by any suitable means, including but not limited to adhesives and welding. In one embodiment, locations 134 may be threaded to allow simple and quick threading and unthreading of misting heads 135 to and from locations 134 to allow quick and simple removal, replacement, and/or cleaning of misting heads 135. Locations 134 also allow a user to couple a plug thereto to prevent liquid flow from liquid distribution device 128 at plugged location(s) 134, such as in the event that there are no plants requiring liquid at that particular location. Plugging one or more locations 134 may provide higher pressure at other, unplugged location(s) 134. In one embodiment, liquid distribution device 128 is capable of withstanding long term use at pressures more than 100 pounds per square inch.

Liquid distribution device 128 may be used for a variety of cultivating processes including hybrid hydroponics, low pressure aeroponics, Amazonian aeroponics, hybrid nutrient film technique, high pressure aeroponics, true aeroponic grow, or any other type of aeroponic or hydroponic processes. In the embodiment shown, liquid distribution device 128 is configured to redundantly spray liquid onto plants 22. In such an embodiment, each plant 22 is sprayed or misted with liquid by at least two liquid sources. This redundancy helps ensure each plant 22 is provided with liquid in the event a liquid source (e.g., a misting head) fails due to blockage or other failure. As a result, singular misting head blockages may cause plants 22 show signs of plant stress, but will not result in plant death within hours, which is typical if the liquid supply is cut-off.

System 20 is capable of distributing a variety of types of liquid to plants 22 therein. Such liquids may include, but are not limited to, water, and a nutrient solution, among others. With respect to nutrient solutions, the system 20 is capable of distributing any type of nutrient solution for plants. Exemplary nutrient solutions include, but are not limited to, General Hydroponics FloraMicro 5-0-1, General Hydroponics FloraGro 2-1-6, General Hydroponics FloraBloom 0-5-4, General Organics BioBud Bloom Booster 0.5-0.1-1, General Organics BioThrive Plant Food Grow 4-3-3, or any other of a wide variety of nutrient solutions capable of being used in aeroponic, hydroponic, aquaponics or combination environments. In one embodiment, nutrient liquid may be stored in the bottom portion 92 of the container 80 to facilitate deep water culture hydroponics.

Figure 10:
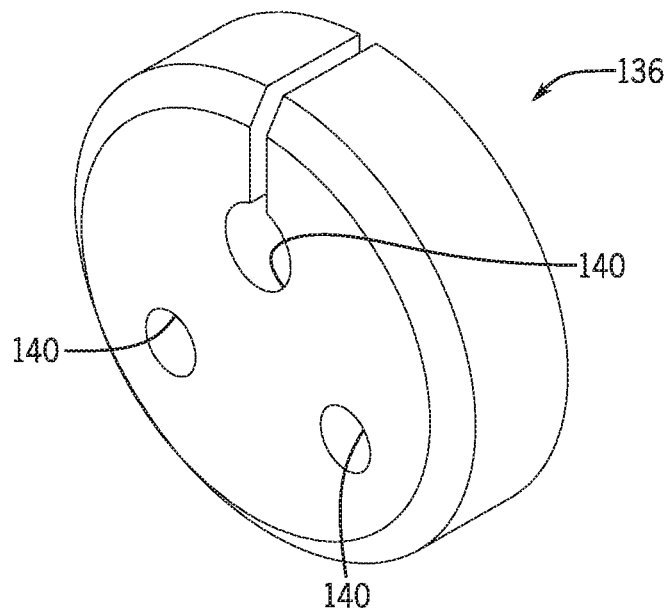
FIG. 10 is a perspective of one embodiment of a grommet of the plant cultivation system of FIG. 1.
Figure 11:
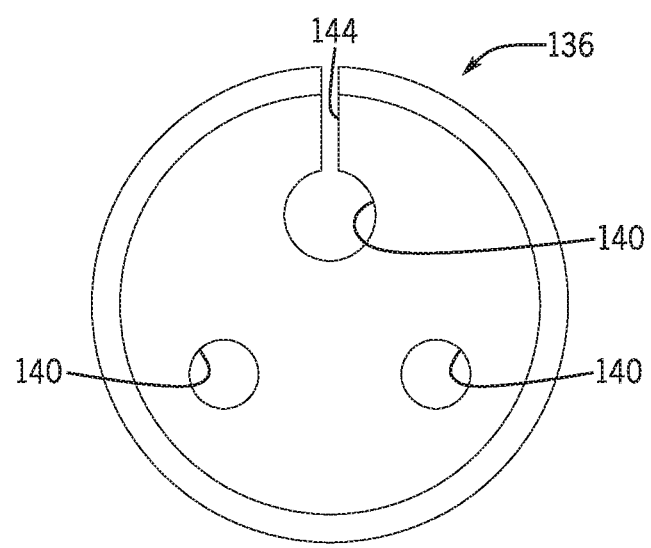
FIG. 11 is a front view of the grommet of FIG. 10.

Turning now to FIGS. 10 and 11, a grommet 136 positioned in access opening 116 defined in container 80 is shown. Grommet 136 is configured to seal access opening 116 to prevent leaking of liquid through access opening 116 from the interior of container 80. In the embodiment shown, grommet 136 includes a plurality of openings 140 therethrough that allow items to pass through the grommet into and/or out of container 80, while also preventing liquid from leaking out of the container. As shown, grommet 136 includes three openings 140. The grommet 136 may alternatively have any suitable number of openings 140 therethrough without departing from the invention. Items that may be configured to pass through grommet 136 include, but are not limited to, a power cord/cable, pneumatic tubes/pipes, liquid tubes/pipes, pump power cords, nutrient liquid supply pipes/tubes, among other items. Grommet 136 may also be made of a wide variety of suitable materials. Grommet 136 may be made of foam, rubber, plastic, or any other resilient material. Openings 140 may also include an expansion slot 144 that allows opening 140 to expand and contract as necessary to accommodate a size of an item positioned therein. In the embodiment shown, one of openings 140 includes an expansion slot 144. In other embodiments, any number of the openings 140 may include an expansion slot 144.

Figure 12:
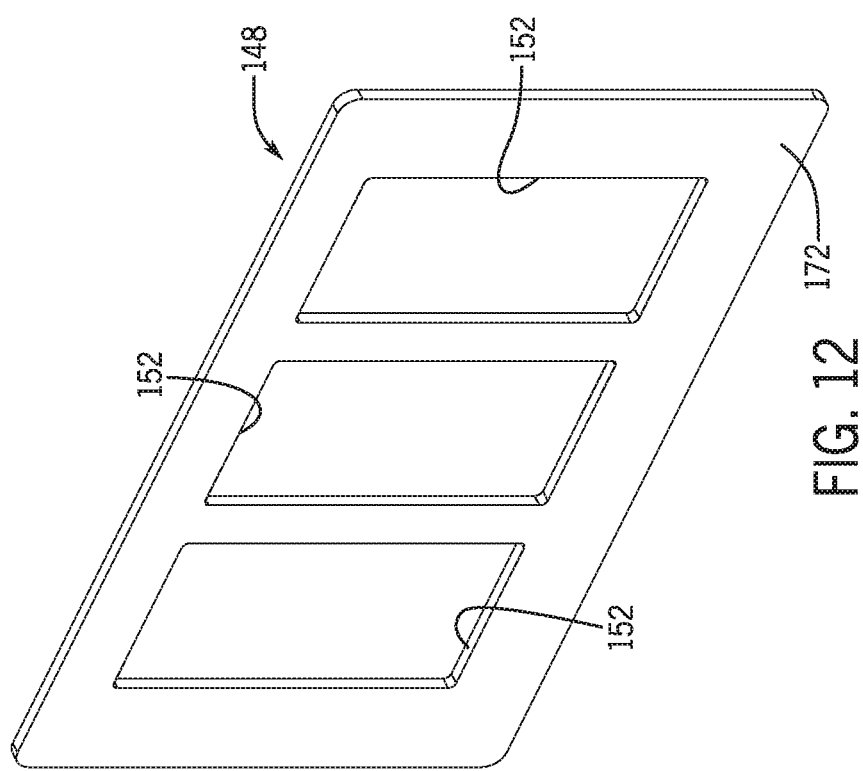
FIG. 12 is a perspective view of one embodiment of a lid of the plant cultivation system of FIG. 1 showing the top of the lid.

Referring now to FIG. 12, a lid 148 for container 80 is shown. Lid 148 is configured to rest on top of container 80 in recess 100. Lid 148 and recess 100 are complementarily shaped to allow a snug fit, but also allow removal of the lid 148 if necessary or desired. In alternative embodiments, lid 148 and recess 100 may fit more or less snugly. Lid 148 includes a plurality of openings 152 defined therein. In the embodiment shown, lid 148 includes three openings 152 having a generally rectangular shape. In alternative embodiments, lid 148 may include any number of openings 152 having any shape, and all of such possibilities are intended to be within the spirit and scope of the present disclosure.

Figure 13:
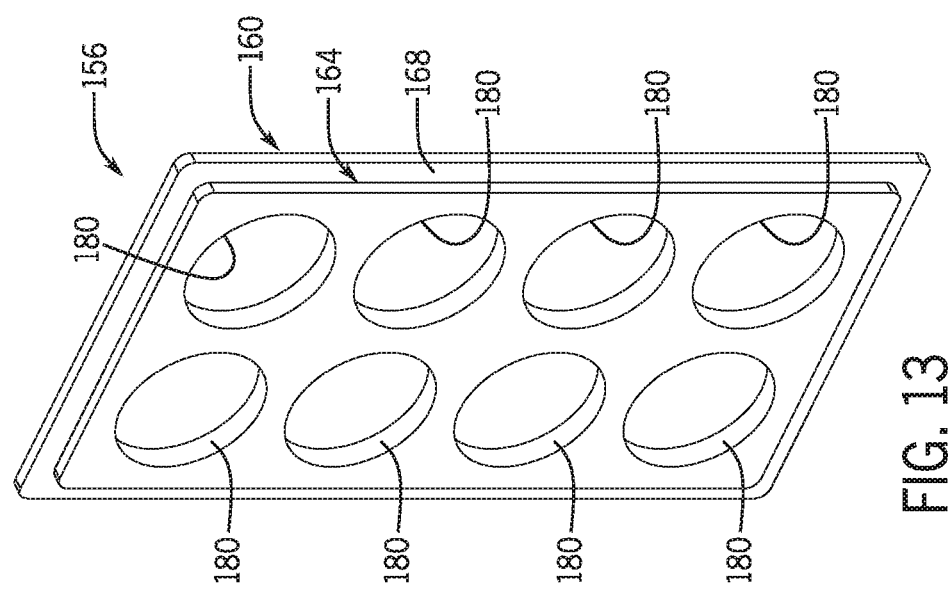
FIG. 13 is a perspective view of one embodiment of a cup support of the plant cultivation system of FIG. 1.
Figure 14:
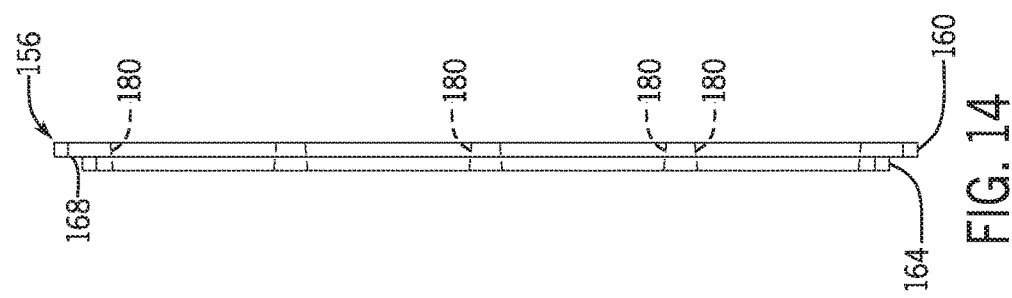
FIG. 14 is a side view of the cup support of FIG. 12.
Figure 16:
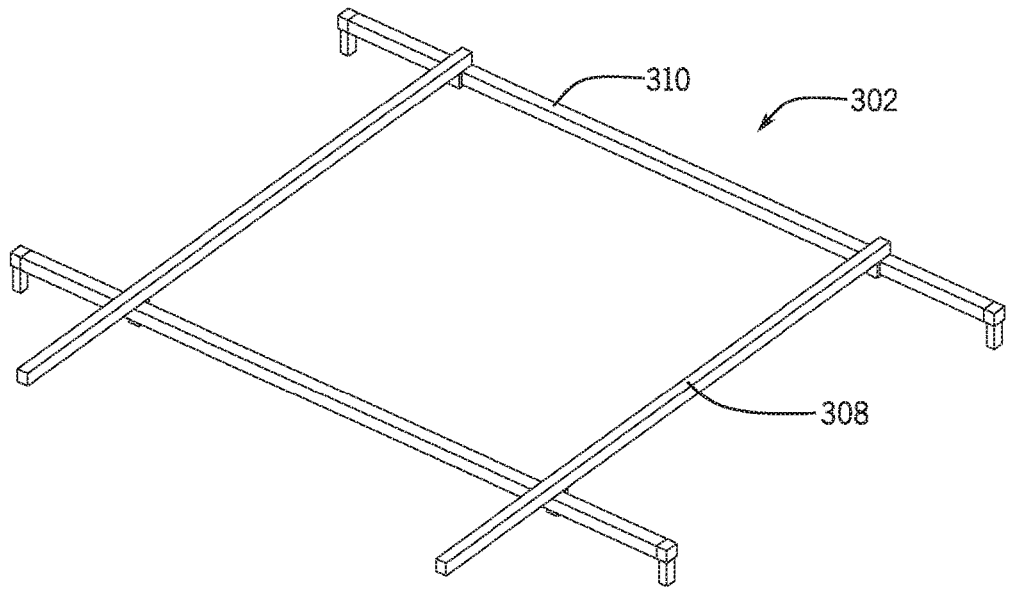
FIG. 16 is a perspective view of one embodiment of a top portion of the plant cultivation system of FIG. 1.

Turning now to FIGS. 13 and 14, system 20 also includes a plurality of cup supports 156. Cup supports 156 are positionable in openings 152 defined in lid 148 and are supported by the lid. In the embodiment shown, the system 20 includes three cup supports 156 having a generally rectangular shape to complement the number and shape of the openings 152 in the lid 148. In other embodiments, the system 20 may include any suitable number of cup supports 156 having any shape, and all of such possibilities are intended to be within the spirit and scope of the present disclosure.

In the embodiment shown, cup supports 156 are similar to each other in structure and, therefore, only a single cup support 156 will be described below with the understanding that the following description applies to all cup supports 156 shown. Each cup support 156 includes a top portion 160 having a first size and a bottom portion 164 having a second size extending downward from the top portion. Bottom portion 164 is smaller than the size of opening 152 in lid 148 and top portion 160 is larger in size than opening 152 in lid 148 such that a bottom surface 168 of the top portion rests on and is supported by a top surface 172 of the lid and the bottom portion of cup support 156 is positioned in the opening. By supporting cup support 156 in this manner, a user may selectively lift the cup support to access below the cup support, remove the cup support, replace with a different cup support, flip the cup support 180-degrees in opening 152, or interchange cup supports with each other. Cup supports 156 are configured to support at least one plant cup 176 (see FIGS. 1-3 and 15).

The cup supports 156 may include any number of apertures 180 and such apertures may have any size to support plant cups 176 of any suitable size. Apertures 180 may also be the same size to support same sized plant cups 176 or cup support 156 may include apertures of different sizes to support different sized plant cups. In the embodiment shown, cup support 156 includes eight apertures 180 sized to support three-inch plant cups 176. The embodiment shown is provided to demonstrate principles of the present disclosure and is not intended to be limiting. As indicated above, cup supports 156 may have any number of apertures 180, which apertures may have any size and be positioned in any configuration in the cup supports 156, and all of such possibilities are intended to be within the spirit and scope of the present disclosure. In the embodiment shown, apertures 180 are tapered such that the apertures are wider at a top of cup support 156 and narrower at a bottom of the cup support. The tapered apertures 180 may provide support to angled side walls of plant cups 176 and help inhibit plant cups 176 from falling through the apertures 180.

Figure 15:
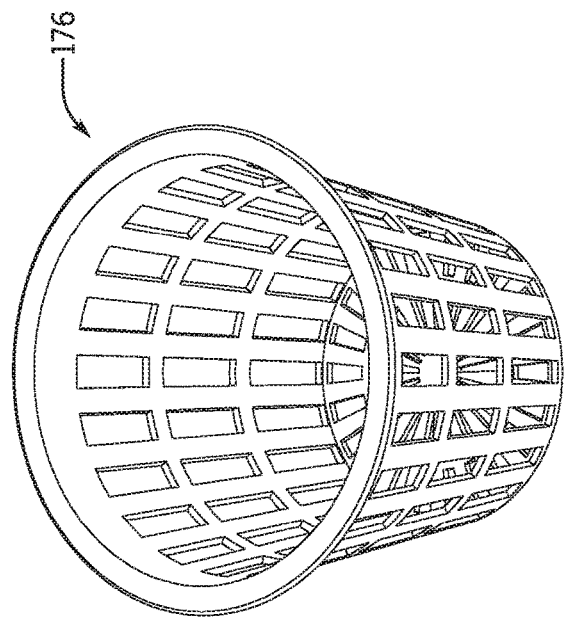
FIG. 15 is a perspective view of one embodiment of a plant cup of the plant cultivation system of FIG. 1.

Turning now to FIG. 15, one embodiment of a plant cup 176 is shown in accordance with the invention. In the embodiment shown, plant cup 176 is a three-inch plant cup, that is, three inches in diameter at the top, but may be tapered to be easily inserted and removed from and aperture 180. However, as indicated above, system 20 is capable of supporting plant cups 176 of any size, any shape and any configuration. Plant cup 176 includes a plurality of openings or slots 178 through which plants' roots and nutrient solution may pass, besides obviously having the top opening through which the upper plant parts may grow.

Referring now to FIGS. 1-2 and 16-17, system 20 includes a frame 70 positioned above enclosure 32 that may support at least one illumination device 248. In the embodiment shown, frame 70 is made of square stock tubing, but the frame may alternatively be made of aluminum extrusion, PVC tubing, or any other suitable material without departing from the invention. Frame 70 at least partially encloses growing area 74. Frame 70 includes side portions 300 and a top portion 302. Side portions 300 include vertical sections 304 and cross members 306. Top portion 302 includes light support members 308 and frame support members 310. Additional support members 310 are positioned between side portions 300. Combined, side portions 300, top portion 302, and support members 310 form frame 70. In the embodiment shown, the parts of frame 70 are removably attached to each other using a friction fit, but any suitable means of attachment may be used without departing from the invention.

Figure 18:
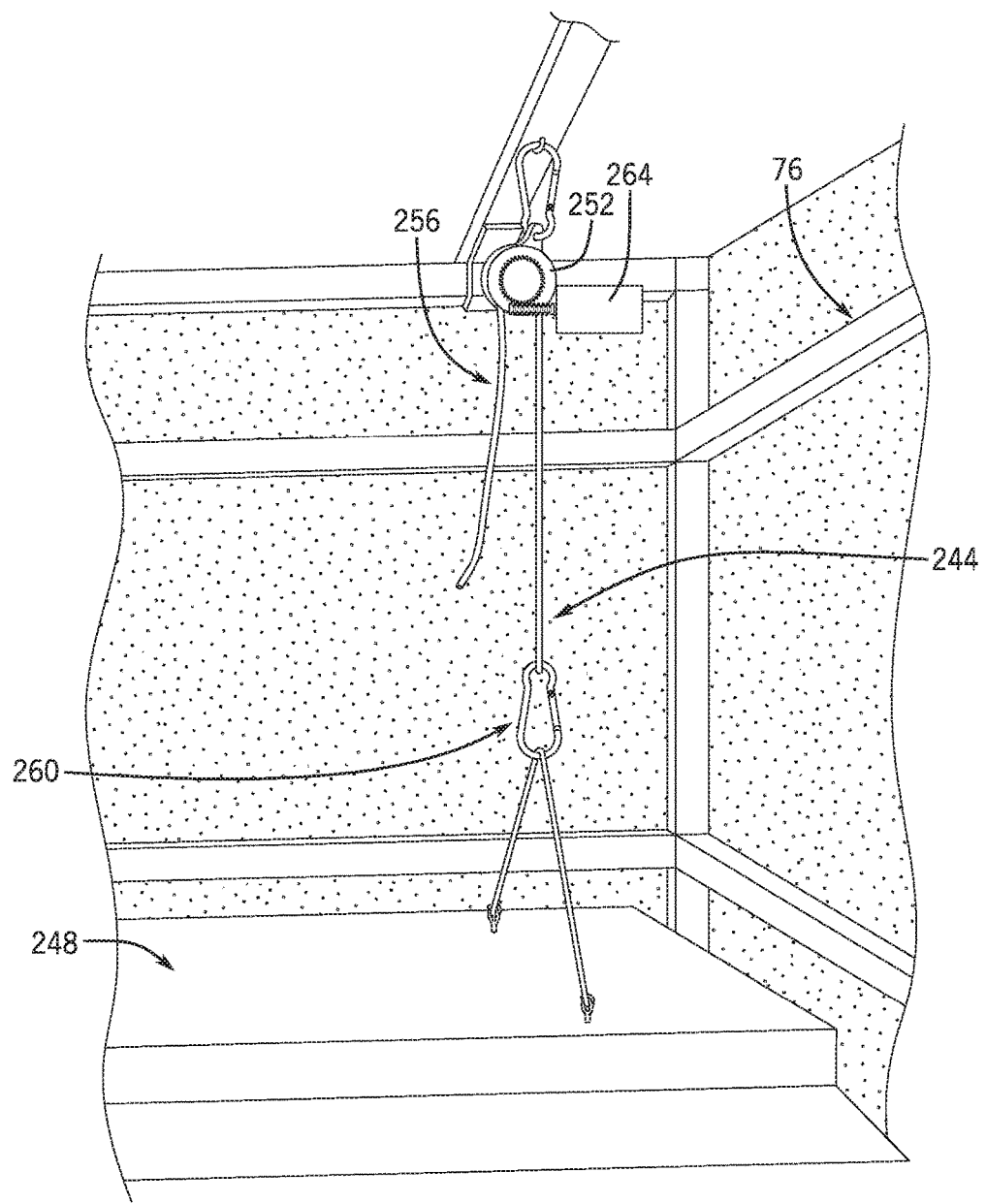
FIG. 18 is a detail perspective view of the plant cultivation system of FIG. 1, showing one embodiment of a light adjustment mechanism.
Figure 19:
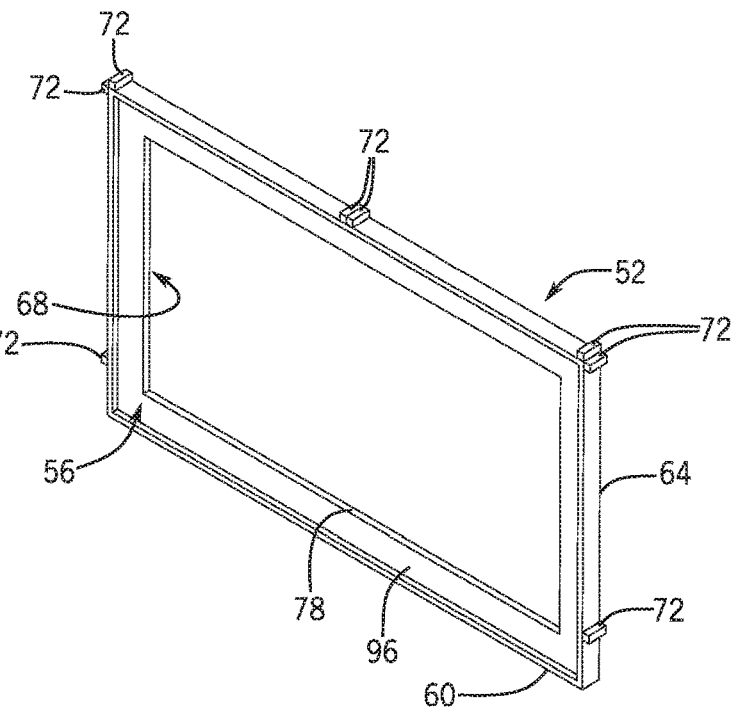
FIG. 19 is a perspective view of one embodiment of a base member for a plant cultivation system in accordance with the invention.

As shown in FIG. 18, one embodiment of a light adjustment member 244 is shown. In the embodiment shown, light adjustment member 244 includes a pulley 252 coupled to one of the coupling members 240, a rope 256 inserted through the pulley 252, and an end of the rope 256 coupled to a connector 260 connected to illumination device 248. System 20 may also include a second pulley at the other end of top member 212 and illumination device 248. A user may pull on a slack end 254 of rope 256 to raise the illumination device 248 or a user may actuate an actuator 262 on pulley 252 to release a grip on rope 256 to allow illumination device 248 to lower. Of course, any other suitable means of raising or lowering illumination device 248 may be used without departing from the invention.

Figure 17:
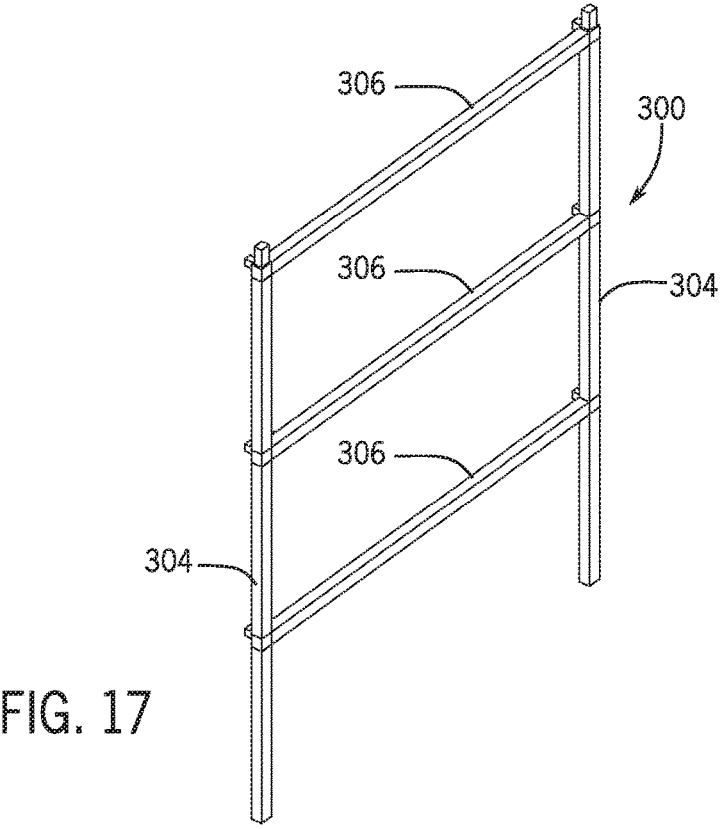
FIG. 17 is a perspective view of one embodiment of a side portion of the plant cultivation system of FIG. 1.

With respect to top member 212 shown in FIG. 17, pulley 252 may be coupled to one of coupling members 240 on side members 228 and the slack end 254 of rope 256 may be inserted through the adjacent coupling member 240 positioned on the associated front-to-rear member 236 such that slack end 254 of the rope 256 may be positioned above and/or on top of the top member 212 outside of the growing area of system 20. Coupling members 240 positioned on the front member 220 of the top member 212 allow an additional illumination device to be coupled to the system 20 for front lighting the plants in system 20. System 20 may include any number and any type of suitable illumination devices and all such possibilities are intended to be within the spirit and scope of the present disclosure. In one embodiment, system 20 may include one or more LED illumination devices. In other embodiments, system 20 may include other types of illumination devices such as, but not limited to, incandescent, fluorescent, high intensity discharge, or natural sunlight.

The one or more illumination devices 248 may also be positioned within system 20 in any of a wide variety of orientations. In one embodiment, system 20 includes a first illumination device 248 horizontally oriented above growing area 74 and a second illumination device vertically oriented in front of the growing area. In other embodiments, system 20 may include a plurality of horizontally oriented illumination devices 248 above growing area 74 and a plurality of vertically oriented illumination devices in front of the growing area.

Turning back to FIG. 2, system 20 may include a reflective member 264 removably attached to side members 76. Reflective member 264 is configured to reflect light emitted by the one or more illumination devices 248, so as to keep it within the growing area 74. Reflective member 264 may have any suitable size, shape, configuration and be made of any suitable reflective materials without departing from the invention. In the embodiment shown, reflective member 264 is positioned to the rear, the right side and the left sides of system 20. In other embodiments, reflective member 264 may be positioned on more or fewer sides of system 20 without departing from the invention. In one embodiment, the reflective member 264 may be made of 600D ballistic nylon fabric. This fabric may have a dimpled metallic reflective interior surface that is highly reflective and may inhibit reflective hot spots. In other embodiments, the reflective member may be made of, but not limited to, foil, Mylar, flat white veneered wood panels, opaque white plastic panels, among others.

Reflective member 264 may be attached within system 20 in a variety of manners. In one embodiment, the reflective member 264 is attached to any number of side members 76 with one or more snaps. In alternative embodiments, reflective member 264 may be attached to one or more side members 76 with hook and loop type fasteners, threaded fasteners, nut and bolt combinations, adhesive, or any other suitable means of attachment. Additionally, reflective member 264 may be a one unitary member or may alternatively be made of multiple sections or panels. Reflective member 264 may be positioned relatively close to growing area 74 and one or more illumination devices 248. Some illumination devices dissipate at relatively short distances. For example, LED lighting may dissipate within approximately 2-4 feet to an extent that it may no longer be absorbed by a plant. Thus, reflective member 264 should be within 2-4 feet of any LED lights to reflect LED light that is not absorbed by plants 22 back into the growing area 74.

The self-contained "drop-in" aspect of system 80, allows a user the ability to procure any suitable enclosure 32 to meet their goal of lowering costs by using salvaged or repurposed enclosures like an outdoor deck box or a simple lumber framed open enclosure, or, if a user is aesthetically minded, a user may use a kitchen cabinet and countertop or like matching cabinet for indoor use, or landscape block for outdoor use. The preceding mention of enclosure options, are just a few examples of typical enclosures. Lastly, frame 70 includes features that allow a user to control all other variables typically found in commercial cultivation like light fixture mounting, light reflection control for optimization of absorption, plant training and plant support by integrating a trellising feature, and a frame for mounting any other accessories like fans to simulate wind stress or to hang $CO_2$ distribution tubing to enhance atmospheric growing conditions in just a small, more confined space instead of an entire room or building. System 80 balances all of the publically known solutions for optimizing plant cultivation in a commercial environment and shrinks it down to a small self-contained unit that can be dropped into any properly sized container with few, if any, limitations.

Turning now to FIGS. 19-22, a second embodiment of a frame 370 for system 20 is shown. Frame 370 may be positioned above enclosure 32 and may support at least one illumination device 248. Base member 52 may either be supported on a top of the enclosure 32 or otherwise attached thereto. Base member 52 includes a wall 56, a top lip 60 extending upward from the wall 56 and a bottom lip 64 extending downward from the wall 56.

Top lip 60 and the bottom lip 64 extend around the wall 56. A bottom surface 68 of wall 56 rests on the top of enclosure 32 and bottom lip 64 is sized and shaped to complement the size and shape of the top of enclosure 32 such that the bottom lip relatively tightly surrounds the top of the enclosure. Base member 52 provides stability and rigidity to the top of enclosure 32 due to the complementary shape of bottom lip 64 and the size of the enclosure. That is, bottom lip 64 provides lateral support to sides of enclosure 32.

Base member 52 also includes a plurality of coupling members 72 for coupling a plurality of side members 76 to the base member (described in more detail below). In the embodiment shown, base member 52 includes eight coupling members 72 with two coupling members 72 on ends or sides of the base member and four coupling members 72 located on a rear of the base member. Base member 52 may include any number of coupling members 72 located on the base member 52 in any locations and configurations without departing from the invention. Furthermore, coupling members 72 may be formed in any shape or configuration to accommodate coupling of side members 76 of varying configurations. In other words, side members 76 may be coupled to base member 52 in a variety of manners and the base member will be appropriately configured to facilitate coupling of the side members thereto whether that includes coupling members 72 or some other manner of coupling. In the embodiment shown, wall 56 defines a central opening 78 therein.

Figure 20:
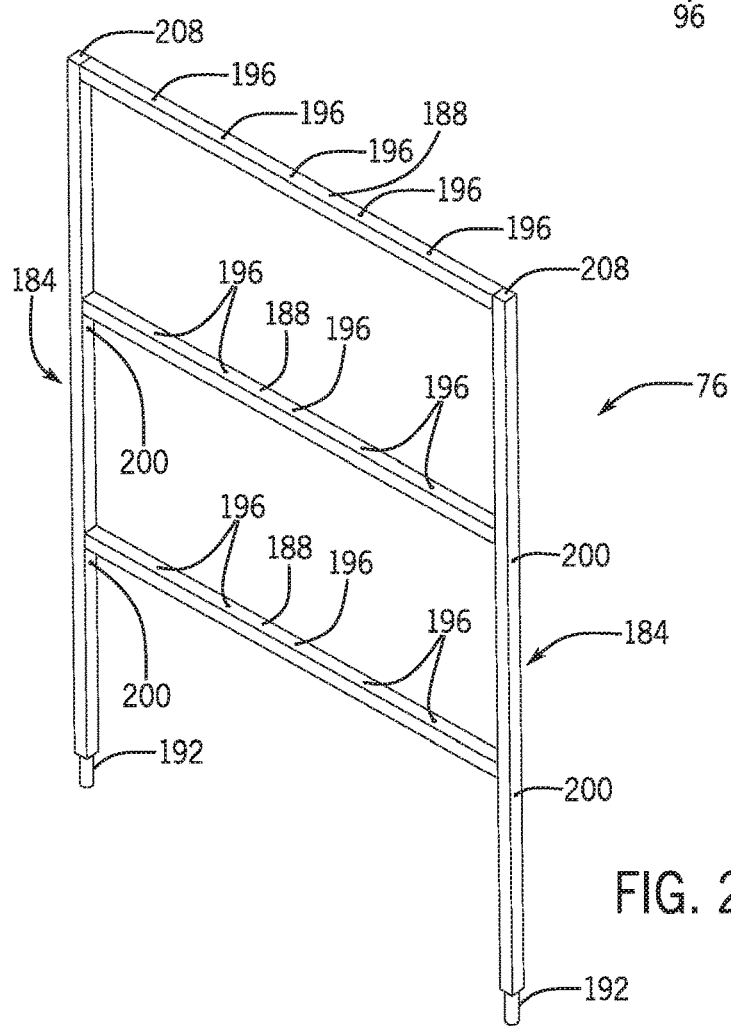
FIG. 20 is a perspective view of one embodiment of a side member for a plant cultivation system in accordance with the invention.

Referring now to FIG. 20, frame 370 includes a plurality of side members 76. In the embodiment shown, frame 370 includes one side member 76 on each of a right side and a left side of the frame and two side members on a rear of the frame. Side members 76 are coupled to base member 52 at coupling members 72.

Side members 76 are similar to each other in structure and, therefore, only one of the side members will be described herein in further detail with the understanding that the following description pertains to all side members 76. In the embodiment shown, each side member 76 includes a pair of spaced-apart uprights 184 and three cross-members 188 coupled to and between the pair of uprights.

At a bottom of each upright 184, the side members 76 include projections 192 that may be inserted into coupling members 72 in the base member 52. Projections 192 and coupling members 72 are complementarily sized and shaped to provide a reliable coupling of side member 76 to base member 52. In the embodiment shown, projections 192 and coupling members 72 couple together with a friction-fit or interference-fit. In other embodiments, side members 76 may be coupled to base member 52 by any other suitable means without departing from the invention. Side members 76 may be interchangeably used with the base member 52 in that any of the side members may be coupled to the base member in any of the locations on any side of the base member.

In the embodiment shown, each cross-member 188 includes a plurality of holes 196 that allow string to be strung from side to side between side members 76. The string may be used to support plants growing in the system 20. In the embodiment shown, holes 196 are positioned in cross-members 188 generally between the apertures 180 defined in the cup supports 156 to assist with growing symmetrically spaced plants 22. In other embodiments, the cross-members 188 may include any number of holes 196 positioned at any locations along the cross-members 188.

In the embodiment shown, the side members 76 include apertures 200 defined in the uprights 184 near and beneath the lower and middle cross-members 188. These apertures 200 allow adjacent side members 76 (see, e.g., the two side members at a rear of the system) to be coupled together with fasteners (e.g., nut and bolt combination, etc.) or allow an additional cross member 204 (see FIG. 18) to be coupled from right side member 76 to left side member 76.

In the embodiment shown, an opening 208 is defined in a top of each upright 184. Openings 208 are configured to receive projections 192 at the bottom of the uprights 184 and allow vertical stacking of side members 76 to accommodate higher plant growth. Any number of side members 76 may be vertically stacked upon each other to provide a frame 370 of any height.

Figure 21:
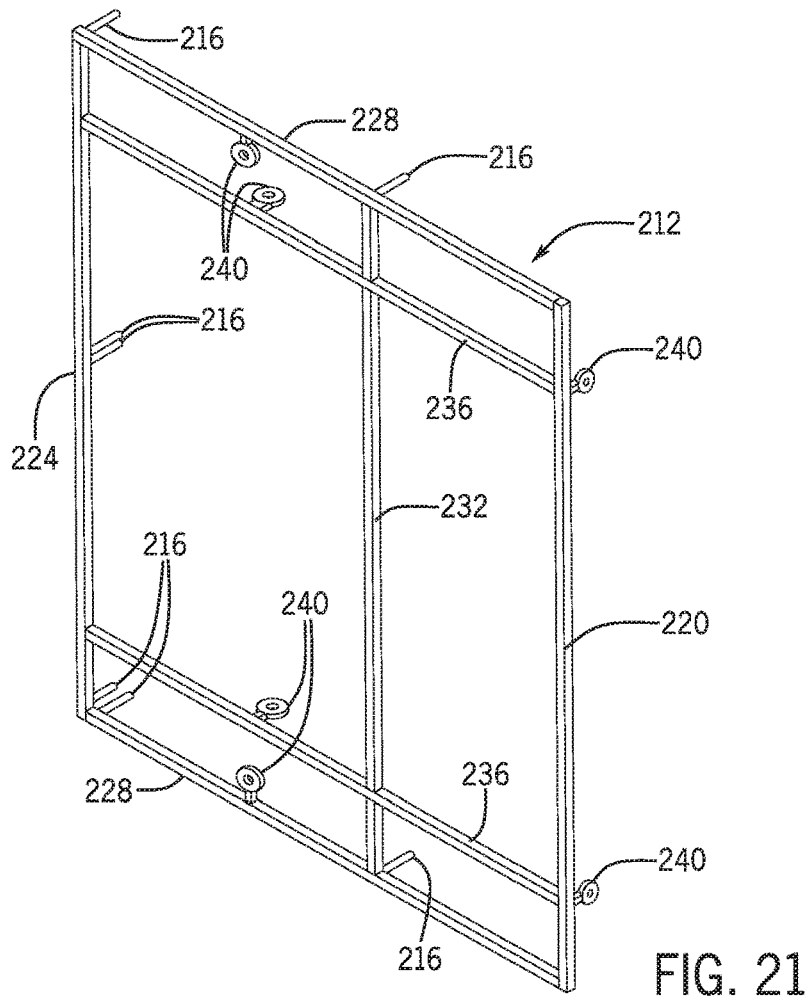
FIG. 21 is a perspective view of one embodiment of a top member for a plant cultivation system in accordance with the invention.

Turning now to FIG. 21, frame 370 includes a top member 212 coupled to side members 76. In the embodiment shown, top member 212 includes a plurality of projections 216 configured to insert into openings 208 defined in tops of uprights 184. In alternative embodiments, top member 212 may be coupled to the side members 76 in any suitable way without departing from the invention.

Coupling top member 212 to side members 76 provides rigidity to system 20. In the embodiment shown, top member 212 includes a front member 220, a rear member 224, a pair of side members 228 coupled to and between the front and rear members 220, 224, a side-to-side cross member 232 and a pair of front-to-rear cross members 236. Top member 212 also includes a plurality of coupling members 240 positioned at various locations on the top member.

In the embodiment shown, top member 212 includes six coupling members 240 with one coupling member 240 positioned on each of side members 228, two coupling members 240 on front member 220, and one coupling member 240 on each of the front-to-rear members 236. In other embodiments, top member 212 may include any number of coupling members 240 positioned at any locations on the top member 212 without departing from the invention. In the embodiment shown, coupling members 240 are eyebolts. In other embodiments, coupling members 240 may have any suitable configuration to allow coupling of items thereto. Coupling members 240 allow one or more light adjustment members 244 to be coupled to and supported by top member 212. Frame 370 may include any number or type of light adjustment members 244 to adjust a height of one or more illumination devices 248.

Figure 22:
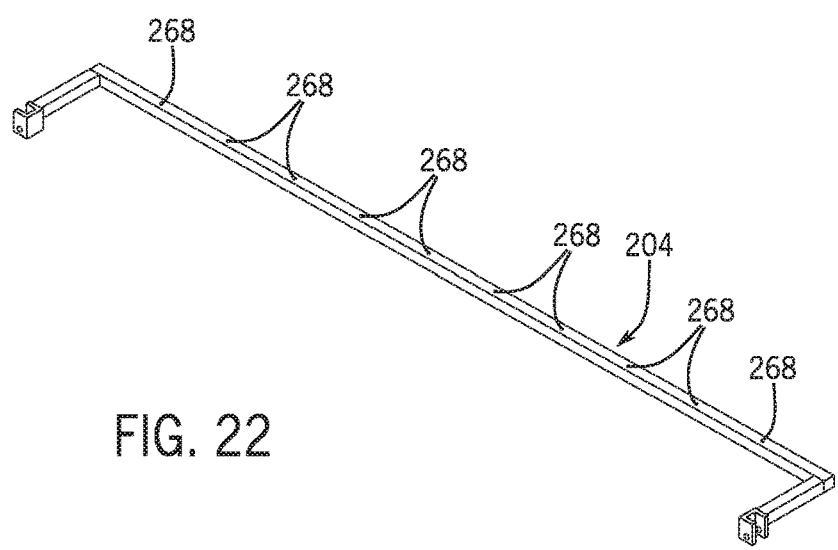
FIG. 22 is a perspective view of one embodiment of a cross member for a plant cultivation system in accordance with the invention.

Turning now to FIG. 22, an additional cross member 204 is shown. As indicated above, additional cross member 204 may be coupled to and between right and left side members 76 to provide additional support to the system 20. Additional cross member 204 may also be used to support plants in a plant training feature with a screen of netting, which may be green or any other suitable color. Some plants may have heavy fruiting or flowering and require additional support, which may be provided by additional cross member 204. In the embodiment shown, additional cross member 204 includes a plurality of apertures 268 for tying or otherwise attaching string, rope, netting, etc., thereto to provide additional support to plants.

In addition, multiple systems 20 may be coupled in fluid communication with each other, either in series or in parallel, and may share one or more of pump(s), drain(s), fluid pipes, power source(s) (e.g., DC power source(s), AC power source(s), etc.), or any other components utilized to operate the system. In such an embodiment, each of the plurality of systems 20 may include their own growing area 74, or a plurality of systems 20 may cooperate to provide common growing area(s).

It should be understood that the use of any orientation or directional terms herein such as, for embodiment, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For embodiment, the systems, apparatuses, devices and any components thereof may be utilized in any orientation and use of such terms is intended to correspond to the exemplary orientation of the systems, apparatuses, devices and their components illustrated in the drawings. The use of these terms in association with the systems, apparatuses, devices and their components are not intended to limit them or their components to a single orientation or to limit them and their components in any manner.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A system for cultivating plants in a controlled environment, the system comprising:
    an enclosure having an internal cavity and an open top;
    a container disposed within the internal cavity, the container having a top portion having a first size, a middle portion extending downward from the top portion and having a second size that is smaller than the first size, and a bottom portion extending downward from the middle portion and having a third size that is smaller than the second size;

the container further including at least one shelf positioned at the transition between the middle portion and the bottom portion;

a liquid distribution device including a plurality of liquid emission locations to deliver liquid to desired locations within the container and at least one coupling location for attaching a source of liquid;

the liquid distribution device supported by the shelf;

a lid supported by the container, the lid including at least one cup support opening;

at least one cup support positioned in the at least one cup support opening, each cup support including at least one plant cup opening;

at least one plant cup positioned in the at least one plant cup opening, each plant cup capable of supporting a plant, the plant cup including a plurality of openings to allow plant roots and liquid to pass therethrough; and a frame removably attached to the enclosure, the frame configured to provide support for at least one illumination device.

2. The system for cultivating plants of claim 1, further including a base.

3. The system for cultivating plants of claim 2, further including a plurality of wheels attached to the base.

4. The system for cultivating plants of claim 1, wherein the position of the at least one illumination device is adjustable.

5. The system for cultivating plants of claim 4, wherein:
at least one pulley is attached to the frame; and
at least one rope passing through the at least one pulley; the at least one rope removably attached to the at least one illumination device such that the at least one illumination device may be adjusted by pulling on the rope.

6. The system for cultivating plants of claim 1, wherein the container includes at least one drain hole.

7. The system for cultivating plants of claim 1, wherein the container further includes an access opening.

8. The system for cultivating plants of claim 7, further comprising a grommet inserted into the access opening, the grommet including at least one port.

9. The system for cultivating plants of claim 1, further including a reflective member removably attached to the frame.

10. The method of claim 9, further including the step of adjusting the height of the illumination device in relation to the plant.

11. The method of claim 9, further including the step of selectively operating the pump to control the amount of water and nutrients to provide to the plants.

12. A method for cultivating plants using a self-contained plant cultivation system, the method including the steps of:
providing an enclosure having an internal cavity and an open top;
inserting a container into the internal cavity, the container having a top portion having a first size, a middle portion extending downward from the top portion and having a second size that is smaller than the first size, and a bottom portion extending downward from the middle portion and having a third size that is smaller than the second size;
the container further including at least one shelf positioned at the transition between the middle portion and the bottom portion;
providing a liquid distribution device supported by the shelf, the liquid distribution device including a plurality of liquid emission locations to deliver liquid to desired locations within the container and at least one coupling location for attaching a source of liquid;
providing a pump connected to a source of water and nutrients;
coupling the pump to the at least one coupling location;
providing a lid supported by the container, the lid including at least one cup support opening;
providing at least one cup support positioned in the at least one cup support opening, each cup support including at least one plant cup opening;
positioning at least one plant cup in the at least one plant cup opening, each plant cup capable of supporting a plant, the plant cup including a plurality of openings to allow plant roots and liquid to pass therethrough;
providing a plant in each of the plant cups;
removably attaching a frame to the enclosure, the frame configured to provide support for at least one illumination device;
providing a water and nutrient solution to the plant; and
selectively illuminating the illumination device.

13. A system for cultivating plants in a controlled environment, the system comprising:
an enclosure having an internal cavity and an open top, and configured to provide support for at least one illumination device;
a container disposed within the internal cavity, the container having a top portion having a first size;
a middle portion positioned below the top portion and having a second size that is smaller than the first size;
a bottom portion positioned below the middle portion and having a third size that is smaller than the second size; and
at least one shelf positioned between the middle portion and the bottom portion;
a liquid distribution device supported by the shelf, and including a plurality of liquid outlets to distribute liquid to desired locations within the container, and at least one connector for attaching to a source of liquid;
a lid supported by the container, the lid having at least one cup support opening;
at least one cup support positioned in the at least one cup support opening, each cup support having at least one plant cup opening; and
at least one plant cup positioned in the at least one plant cup opening, each plant cup capable of supporting a plant, the plant cup having a plurality of openings to allow plant parts and liquid to pass therethrough.

* * * * *